March 9, 1943.　　　W. C. JONES　　　2,313,244
MUFFLER
Filed Dec. 16, 1941　　　2 Sheets-Sheet 1
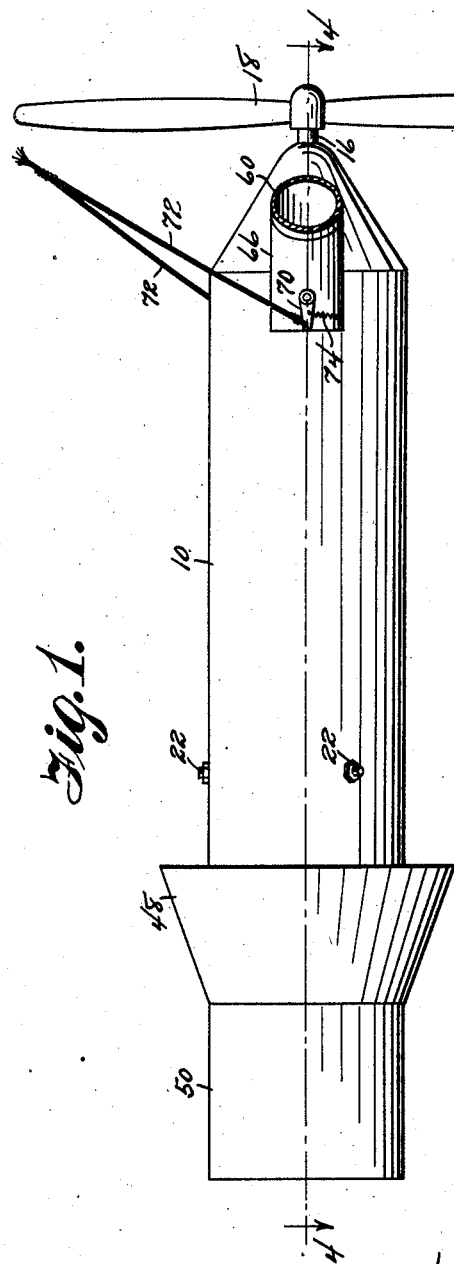
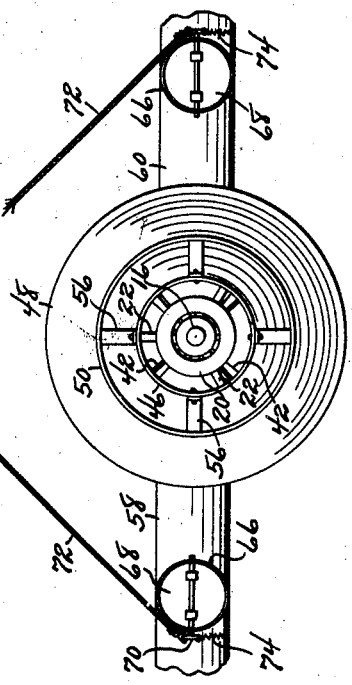
William C. Jones
INVENTOR
BY
Victor J. Evans & Co.
ATTORNEYS March 9, 1943.  W. C. JONES  2,313,244
MUFFLER
Filed Dec. 16, 1941  2 Sheets-Sheet 2
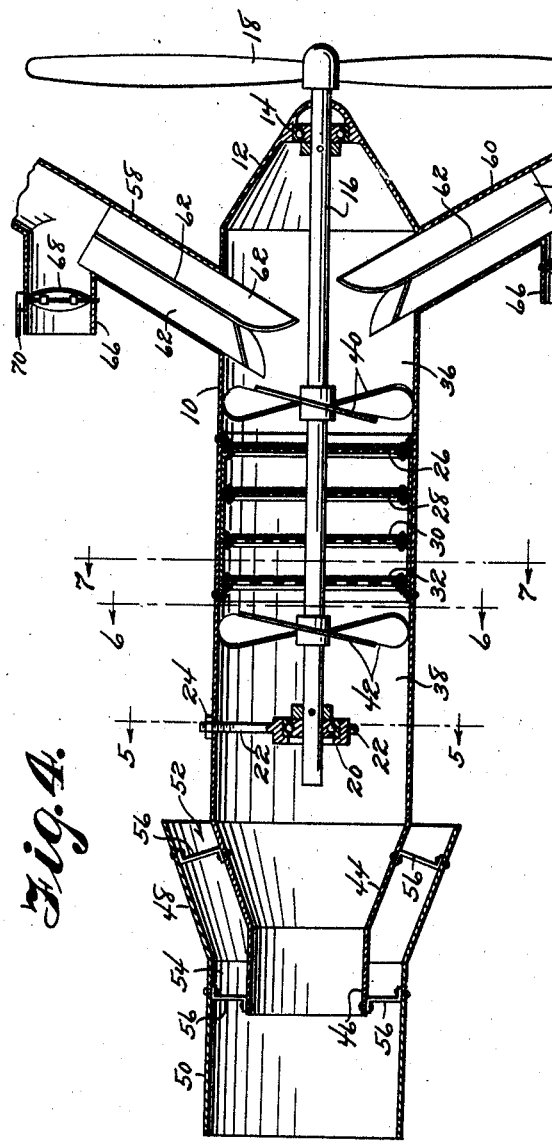
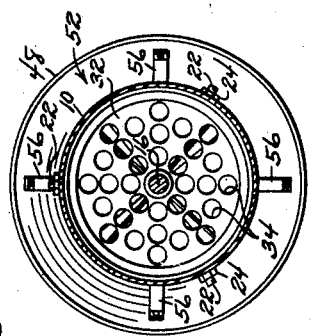
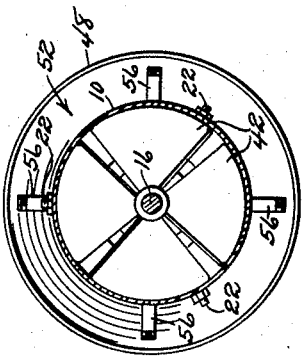
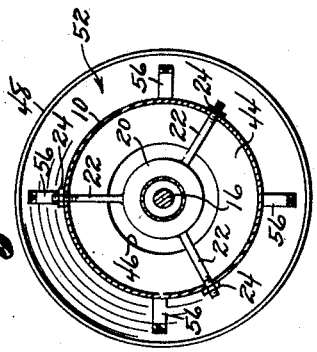
William C. Jones  INVENTOR.
BY
Victor J. Evans & Co.
ATTORNEYS

Patented Mar. 9, 1943

2,313,244

UNITED STATES PATENT OFFICE 2,313,244

MUFFLER

William C. Jones, El Paso, Tex.

Application December 16, 1941, Serial No. 423,246

8 Claims. (Cl. 181—64)

My invention relates to internal combustion engines, and has among its objects and advantages the provision of an improved muffler embodying means for forming a substantial vacuum to relieve the back pressure on the exhaust side of the engine.

In the accompanying drawings:

Figure 1 is a side view of a muffler in accordance with my invention;

Figure 2 is a rear end view;

Figure 3 is a perspective view of an exhaust deflecting divider incorporated in one of the exhaust conduits;

Figure 4 is a sectional view along the line 4—4 of Figure 1;

Figure 5 is a sectional view along the line 5—5 of Figure 4;

Figure 6 is a sectional view along the line 6—6 of Figure 4; and

Figure 7 is a sectional view along the line 7—7 of Figure 4.

In the embodiment selected for illustration, I make use of a cylindrical-shaped housing 10 having a tapered nose 12 in which is mounted a bearing 14 rotatably supporting a shaft 16 driven by a propeller 18. The housing 10 is secured to an aircraft (not shown), preferably exteriorly thereof and closely adjacent the engine or engines, with the nose 12 pointing in the direction of the movement of the aircraft in flight so as to utilize such aircraft movement for driving the propeller 18. A second bearing 20 is mounted inside the housing 10 for supporting the opposite end of the shaft 16, which bearing is arranged concentrically of the housing and supported by three equally spaced rods 22 extending through openings in the housing and provided with nuts 24 for centering and supporting the bearing 20 with respect to the housing.

Inside the housing 10 are arranged muffler walls 26, 28, 30 and 32 provided with progressively enlarged perforations 34, respectively. The wall 26 is the foremost one in the bank and is provided with the smaller perforations.

Figure 4 illustrates the bank of walls 26 through 32 as being located substantially at the mid area and transversely of the housing 10, thereby providing a first vacuum chamber 36 in the forward end of the housing and a second vacuum chamber 38 in the rearward end of the housing.

To the shaft 16 is fixedly secured a fan 40 located inside the first vacuum chamber 36. A second fan 42 is fixedly secured to the shaft 16 inside the second vacuum chamber 38. Figure 4 illustrates a taper 44 at the rear end of the housing 10, which taper terminates in a tubular neck 46 of smaller diameter than the housing 10. Arranged concentrically of the taper 44 and the tubular neck 46 are a draft tube 48 and an exhaust discharge tube 50. Draft tube 48 is of tapered configuration in conformity with the taper 44 but of such diameter as to provide an annular space 52 for the movement of air. The wide end of the draft tube points in the direction of aircraft movement. The exhaust discharge tube 50 is of larger diameter than the tubular neck 46 to provide an annular space 54 constituting a continuation of the space 52. The rear end of the exhaust discharge tube 50 projects some distance beyond the end of the tubular neck 46. Braces 56 fixedly secure the draft tube 48 and the exhaust discharge tube 50 to the housing.

Exhaust conduits 58 and 60 communicate with the vacuum chamber 36, which conduits deliver the exhaust gases from the engines (not shown) to the chamber 36. Conduit 60 is located slightly forwardly of the conduit 58 at least with respect to its communication with the chamber 36. Each conduit is provided with longitudinal dividing walls 62, each having a deflector 64 extending inside the chamber 36. Walls 62 and their respective deflectors 64 deflect the exhaust gases in such manner as to prevent each of the conduits 58 and 60 from operating against the other. In other words, the exhaust gases are discharged into the chamber 36 in such manner as to prevent the respective gas streams from impinging directly one against the other.

Tubes 66 communicate with the respective conduits 58 and 60 and the atmosphere, and each is provided with a damper or valve 68 having a crank arm 70 connected with a cable 72. Springs 74 act on the cranks 70 to bias the valves 68 to closed positions. When it is desired to exhaust the gases to the atmosphere, the valves 68 may be opened by exerting a pull on the cables 72. The valves 68 are opened when the shaft 16 is inactive, as when the aircraft is on the ground.

In operation, fan 40 creates a low pressure condition in the vacuum chamber 36 so as to eliminate back pressure with respect to the exhaust gases. The fan propels the exhaust gases through the silencing walls 26 through 32, and the fan 42 creates a low pressure condition on the delivery side of the silencing plate assembly. Since the draft tube 48 is arranged with its large diameter end forwardly, the draft tube functions as a funnel which causes a stream of air to flow through the space 52, thus creating a suction coacting with the fan 42 for evacuating exhaust gases from the chamber 38.

Without further elaboration, the foregoing will so fully illustrate my invention, that others may, by applying current knowledge, readily adapt the same for use under various conditions of service.

I claim:

1. A muffler comprising a housing open at one end and provided with an exhaust inlet at its other end, baffle means inside said housing dividing the latter into an exhaust receiving chamber and an exhaust outlet chamber at the open end of the housing, a drive shaft, a fan secured to said shaft inside said exhaust receiving chamber to blow the exhaust gases through said baffle means, and a fan secured to said shaft inside said delivery chamber to blow exhaust gases from the housing.

2. The invention described in claim 1 wherein said baffle means comprises a series of perforated partitions.

3. The invention described in claim 1 wherein said baffle means comprises a series of partitions respectively provided with progressively larger perforations in the direction of said receiving chamber.

4. The invention described in claim 1 wherein there is provided a draft tube about the open end of the housing having a funnel-shaped contour extending in the direction of the normal forward movement of the housing when carried by a vehicle.

5. The invention described in claim 1 wherein said shaft is provided with a propeller for imparting rotation to the shaft when the muffler is in motion through the medium of a carrying vehicle.

6. A muffler for aircraft comprising a housing open at one end and provided with exhaust inlets at its other end, baffle means inside said housing dividing the latter into an exhaust receiving chamber and an exhaust outlet chamber at the open end of the housing, a drive shaft, a fan secured to said shaft inside said exhaust receiving chamber to blow the exhaust gases through said baffle means, a fan secured to said shaft inside said delivery chamber to blow exhaust gases from the housing, said exhaust inlets being provided with deflectors for deflecting the exhaust gases to different positions inside the receiving chamber, and a draft tube at the open end of the housing coacting with said second-mentioned fan for evacuating exhaust gases from the housing.

7. The invention described in claim 6 wherein said baffle means comprises a series of spaced plates respectively provided with perforations of increasingly larger diameters in the direction of the open end of the housing.

8. The invention described in claim 6 wherein said inlets are provided with valves for opening the inlets exteriorly of said housing to pass the exhaust gases to the atmosphere.

WILLIAM C. JONES.